(12) United States Patent
Medvinsky (10) Patent No.: US 7,656,794 B2
(45) Date of Patent: Feb. 2, 2010

(54) METHOD AND APPARATUS FOR AUTHENTICATED QUALITY OF SERVICE RESERVATION

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 865 days.

(21) Appl. No.: 10/350,538

(22) Filed: Jan. 24, 2003

(65) Prior Publication Data

US 2003/0137944 A1   Jul. 24, 2003

Related U.S. Application Data

(60) Provisional application No. 60/351,606, filed on Jan. 24, 2002.

(51) Int. Cl.
*H04L 12/56* (2006.01)
*H04L 9/32* (2006.01)

(52) U.S. Cl. .................. 370/230; 370/395.21; 370/400; 726/2

(58) Field of Classification Search ................ 713/171; 709/206; 370/400–410; 726/1–21, 26–30
See application file for complete search history.

(56) References Cited

U.S. PATENT DOCUMENTS

| 6,147,975 | A | 11/2000 | Bowman-Amuah |
| 6,185,184 | B1 | 2/2001 | Mattaway et al. |
| 6,185,288 | B1 | 2/2001 | Wong |
| 6,366,577 | B1 * | 4/2002 | Donovan ..................... 370/352 |
| 6,539,483 | B1 * | 3/2003 | Harrison et al. ................ 726/1 |
| 6,606,493 | B1 * | 8/2003 | Chow et al. .............. 455/414.1 |
| 6,614,781 | B1 * | 9/2003 | Elliott et al. ................. 370/352 |
| 7,055,170 | B1 * | 5/2006 | Karmouch et al. ............. 726/2 |
| 7,412,598 | B1 * | 8/2008 | Gleichauf ................... 713/155 |
| 7,421,487 | B1 * | 9/2008 | Peterson et al. ............. 709/223 |
| 2002/0064149 | A1 * | 5/2002 | Elliott et al. ................ 370/352 |

FOREIGN PATENT DOCUMENTS

WO   WO-03063429 A1 *  7/2003

* cited by examiner

*Primary Examiner*—Tri H Phan
(74) *Attorney, Agent, or Firm*—Larry T. Cullen (57) ABSTRACT

A method and apparatus for providing authenticated quality of service reservation in a communication system. According to one embodiment of the invention a signaling controller distributes keys for use by a first quality of service server and a router for establishing quality of service over a communication system.

19 Claims, 10 Drawing Sheets

METHOD AND APPARATUS FOR AUTHENTICATED QUALITY OF SERVICE RESERVATION

CROSS-REFERENCES TO RELATED APPLICATIONS

This patent claims the benefit of U.S. provisional patent application 60/351,606 filed on Jan. 24, 2002 and entitled "Method and Apparatus for Authenticated RSVP for IP Telephony" which is incorporated herein by reference in its entirety for all purposes.

STATEMENT AS TO RIGHTS TO INVENTIONS MADE UNDER FEDERALLY SPONSORED RESEARCH AND DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable

The embodiments of this invention relate generally to providing security for Quality of Service reservations.

BACKGROUND

Quality of Service ("QoS") is a common term used by those of ordinary skill in communication systems. Essentially, it refers to the ability of networks to ensure and maintain certain performance parameters for each application according to the specified needs of each user. Examples of QoS parameters are bandwidth, delay, jitter, information loss, network availability, and security. However, not all are required. Nor is this an exclusive list.

To establish a QoS reservation, the requesting device needs to be able to communicate with a device that grants QoS reservations. However, when the requesting device is located in an insecure environment, such as a network different from that in which the QoS granting device is located, then authenticated communication is desired.

Thus, there is a need for a way to distribute authentication keys so as to allow a client requesting QoS from a network to be authenticated to a device which grants the requested QoS. For example, there is a need to reduce the number of denial of service possibilities on Voice over IP networks.

SUMMARY

One embodiment of the invention provides a method for securing a quality of service reservation between a client computer and a quality of service server by providing a signaling controller; coupling the signaling controller with a first quality of service server operable for establishing quality of service in a communication system; coupling the signaling controller with a router located on a local network of a user, wherein the router is coupled with a client computer operable for requesting a quality of service reservation from a first quality of service server; wherein the user provides a key for use by the router.

Another embodiment of the invention provides a method for securing a quality of service reservation between a client computer and a quality of service server by providing a signaling controller; coupling the signaling controller with a first quality of service server operable for establishing quality of service in a communication system; coupling the signaling controller with a router located on a local network of a user, wherein the router is coupled with a client computer operable for requesting a quality of service reservation from the first quality of service server; establishing a key for use by the router; receiving from the user the key for use by the signaling controller; receiving at the signaling controller a request from the client computer to authorize the first quality of service server to provide the client computer with a quality of service reservation conveying an authorization from the signaling controller to the first quality of service server so as to authorize the first quality of service server to provide the client computer with the quality of service reservation; and conveying the authorization by conveying the key to the first quality of service server.

Further embodiments of the invention will be apparent to those of ordinary skill in the art by consideration of the specification taken in conjunction with the accompanying figures, wherein certain methods, apparatuses and articles of manufacture for practicing the various embodiments of the invention are illustrated. However, it is to be understood that the invention is not limited to the details disclosed but includes all such variations and modifications as fall within the spirit of the invention and the scope of the claims.

DESCRIPTION

When a client computer requires quality of service parameters for a communication system across which the client computer will be transmitting or receiving information, the client computer typically engages in a reservation protocol to reserve the quality of service from the communication system. This reservation allows the communication system to allocate its resources so that a requested quality of service is available. Therefore, before the transmission begins, the client computer and a network, for example, can negotiate the quality of service parameters to insure that they are available. A "client computer" can include a variety of computing devices—e.g., a personal computer or a router. Essentially it is considered to be a device having a processor for communication over a network.

In some situations, it is desirable that the client computer and quality of service server through which reservations are made utilize a key for authenticating messages sent to one another. This helps to ensure that an attacker attempting to initiate a denial of service attack cannot do so because he does not have the authentication key utilized by the client computer and the quality of service computer.

When the client computer is located in an unsecured network which is in communication with the network of the quality of service computer, it is necessary to distribute the key to the client computer and the quality of service server. When previously established secure interfaces exist, the key can be distributed through those secure interfaces. However, when no such secure interface exists, then the key is distributed by other means. Furthermore, when a router exists between the client computer and the communication system over which quality of service is reserved, a key is distributed to the router and to the quality of service server so that reservations can be coordinated between those two devices.

Figure 4:
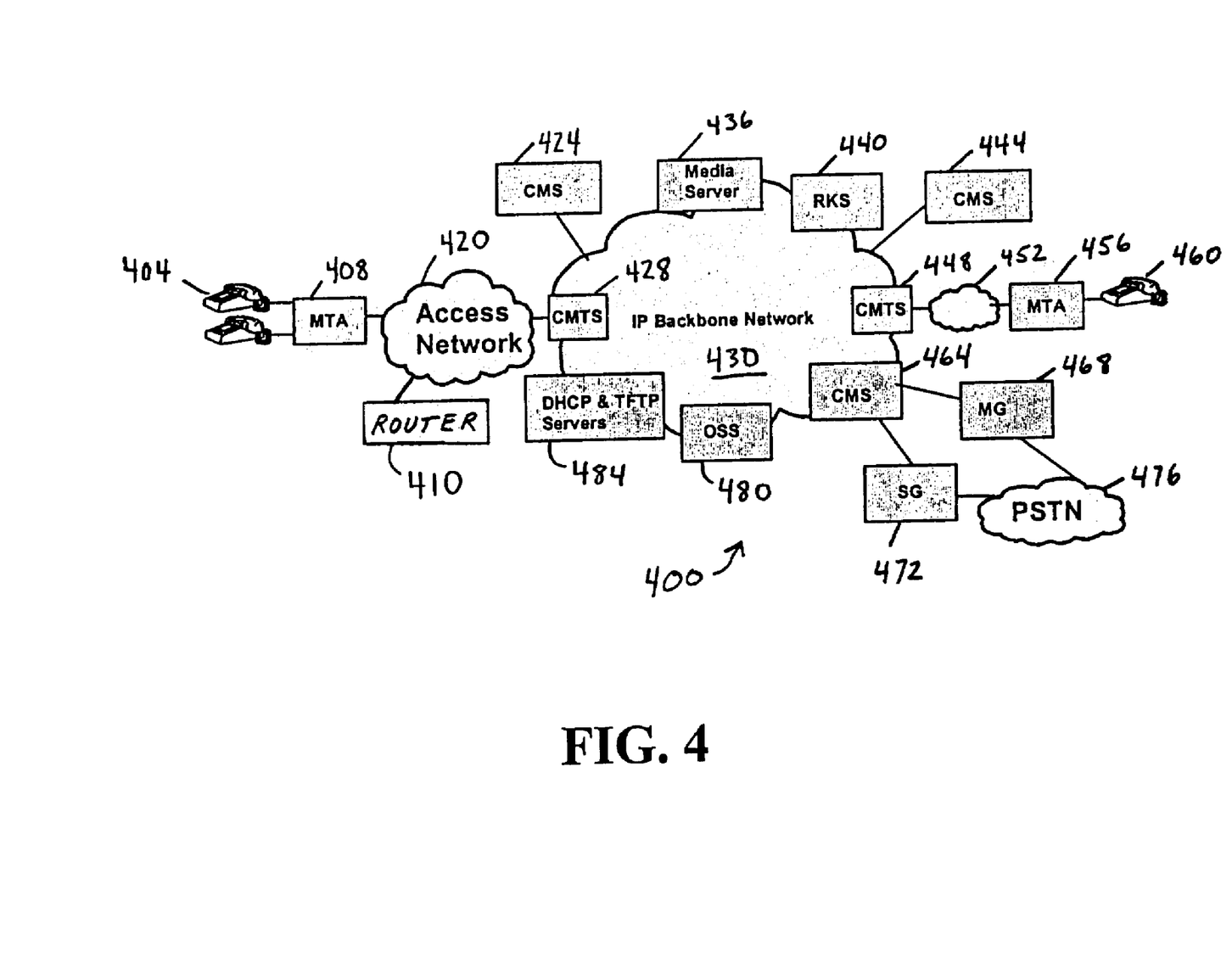
FIG. 4 illustrates an example of a system utilizing quality of service according to one embodiment of the invention.

Referring now to FIG. 4 an exemplary communication system is illustrated. Namely, system 400 illustrates a network for implementing a communication system, such as for example, an IP telephony system. In FIG. 4, a telephone 404 can place a call to telephone 460 over the illustrated network. A media terminal adapter 408 is shown coupled with telephone 404 as well as access network 420. The access network 420 is also coupled with cable modem termination system 428 and router 410. The cable modem termination system is coupled with the IP backbone network 430. Furthermore, a call management system server 424, such as a gate controller under the packetcable system, is coupled with network 430. In addition, media server 436, record keeping server 440, OSS (Operation and Support System) server 480, DHCP (Dynamic Host Configuration Protocol) and TFTP (Trivial File Transfer Protocol) servers 484 are also shown coupled with IP backbone network 430. A second cable modem termination system 448 is coupled with access network 452. A call management system 444 is also coupled with IP backbone network 430. A second media terminal adapter 456 is coupled with local access network 452 and telephone 460. The IP backbone network can communicate across public service telephone network (PSTN) 476 utilizing call management system 464 media gateway 468 and signaling gateway 472. The media terminal adapter can coordinate quality of service parameters with cable modem termination system 428 so as to permit it to initiate an IP telephony call with telephone 460.

Figure 1A:
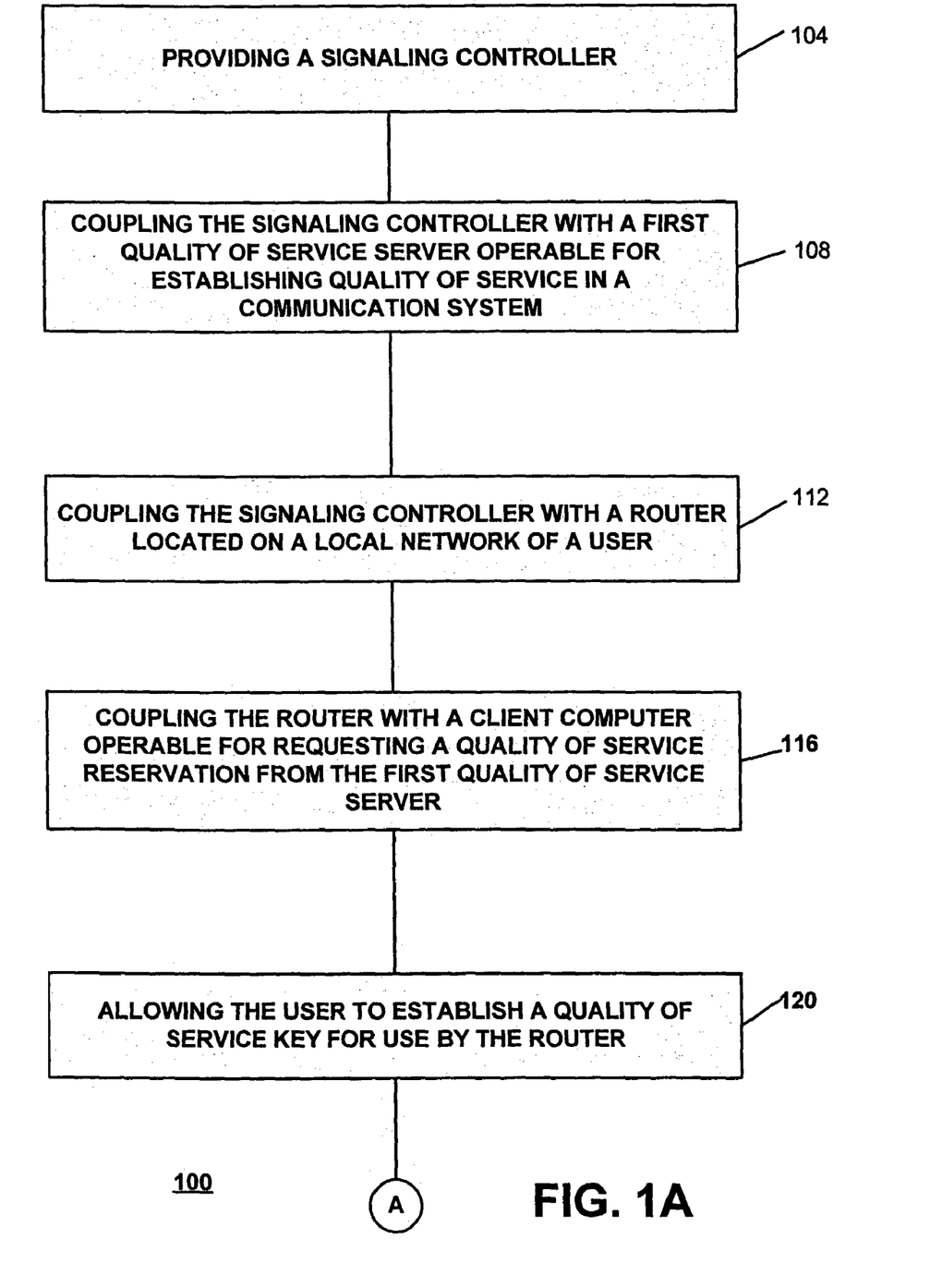
FIGS. 1A, 1B, and 1C show a flowchart illustrating a method of providing quality of service according to one embodiment of the invention.
Figure 1B:
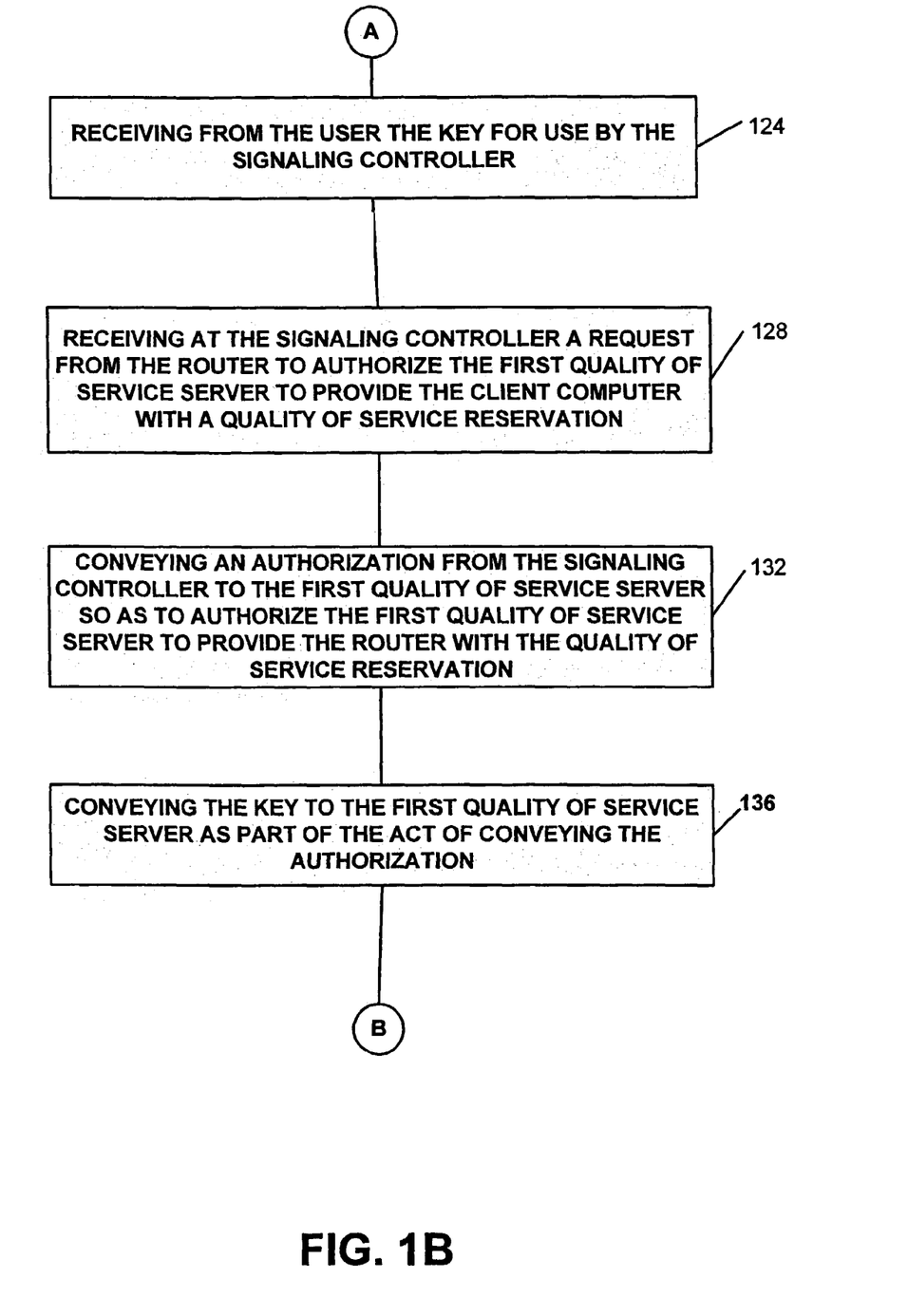
Figure 5:
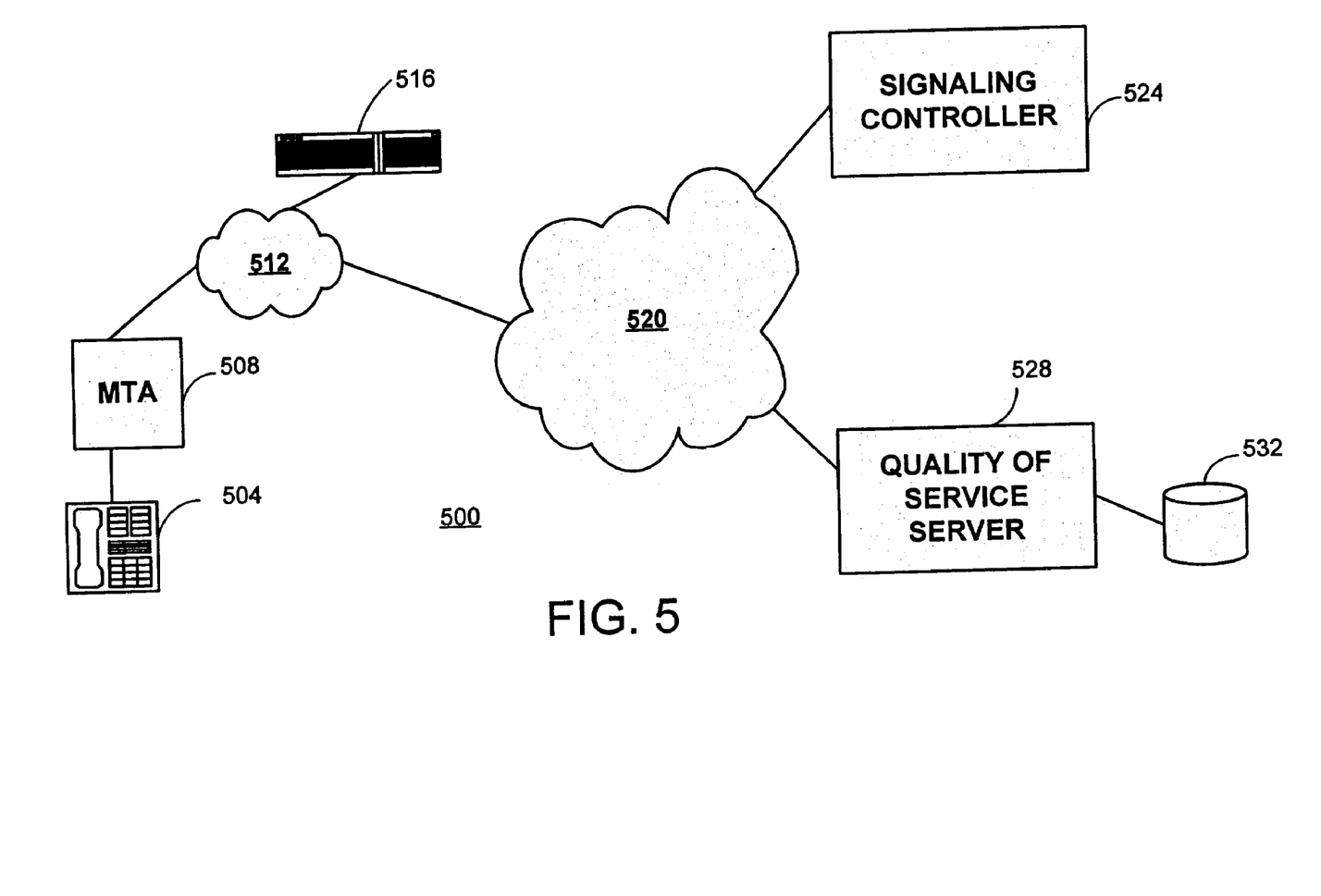
FIG. 5 illustrates a system for providing quality of service according to one embodiment of the invention.

Referring now to FIG. 1 and FIG. 4, a method for implementing one embodiment of the invention can be seen. Namely, FIG. 1 illustrates a flowchart 100 for implementing a method of distributing a key to a router located on an insecure network and to a quality of service server such as the cable modem termination server of FIG. 4. The router is coupled with a media terminal adapter computer such as media terminal adapter 408 in FIG. 4. The media terminal adapter in turn is coupled with the telephone handset. To distribute an authentication key to the router and to the quality of service server, the flowchart of FIG. 1 can be implemented. Namely, as shown in block 104, a signaling controller such as the signaling controller 524 (as shown in FIG. 5) can be provided. A Call Management Server 424 in FIG. 4 is another example of a signaling controller. This signaling controller can be coupled with a first quality of service server which is operable for establishing the quality of service in a communication system, as shown in block 108. One example of a quality of service server would be a cable modem termination system (CMTS) shown as blocks 428 and 448 in FIG. 4. A CMTS is used to allocate bandwidth for use by cable modems on an HFC (Hybrid-Fiber-Coax) cable network. FIG. 5 illustrates a quality of service server 528 coupled with the signaling controller via network 520. In block 112 the signaling controller is also coupled with the router located on a local network of a user as shown in block 112. Referring to FIG. 5, a router 516 is shown coupled with network 512 which in turn is coupled with the signaling controller 524 via network 520. In block 116 the router is coupled with a client computer such as media terminal adapter 508 in FIG. 5 which is operable for requesting a quality of service reservation from the first quality of service server. The media terminal adapter 508 in FIG. 5 is also coupled with telephone 504.

Figure 1C:
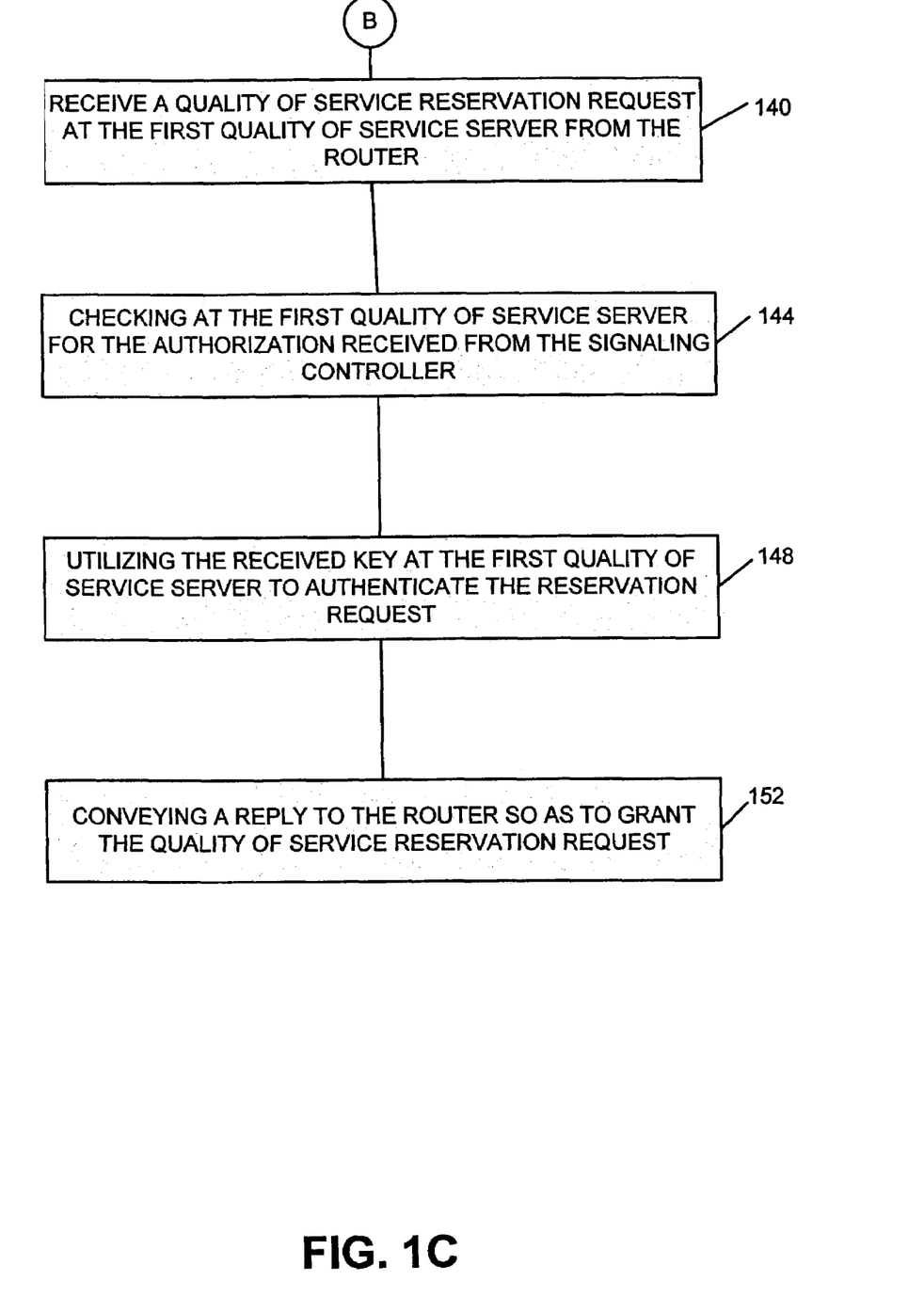

The user provides a quality of service key for use by the router as illustrated in block 120. Unfortunately, with currently available technology, many routers do not provide an automated key management interface for protecting a QoS reservation protocol. Therefore, the quality of service key is entered manually by the user in the router. For practicality reasons, this invention tries to work around this limitation in a router rather than redefining router security—so that this invention can be implemented with routers that are available off-the-shelf today. Furthermore, the user distributes the key for use by the signaling controller as shown in block 124. The signaling controller can receive the key from the user in a variety of ways. For example, the user could email the value of the key to the operator of the signaling controller for entry by the operator. Furthermore, the user could telephone the customer support representative and instruct the customer support representative to enter the key in the signaling controller. In addition, the user could access via secure communications over the internet an application program which facilitates automatic entry of the key in the signaling controller. Once received, the key is entered in a subscriber profile of the user at the signaling controller. Block 128 shows that a request from the router, such as router 516 in FIG. 5, is received at the signaling controller to authorize the first quality of service server to provide the router with a quality of service reservation. The signaling controller conveys an authorization to the first quality of service server so as to authorize the first quality of service server to provide the router with the quality of service reservation as shown in block 132. The key obtained by the signaling controller is conveyed to the first quality of service server as part of the act of conveying the authorization as shown in block 136. In block 140 a quality of service reservation request is received at the first quality of service server from the router. The first quality of service server checks for the authorization from the signaling controller in block 144. Utilizing the received key at the first quality of service server, the first quality of service server authenticates the reservation request as shown in block 128. The key can be stored in a memory, such as database 532 in FIG. 5. In block 152 of FIG. 1C, a reply is conveyed to the router so as to grant the quality of service reservation request.

Figure 2:
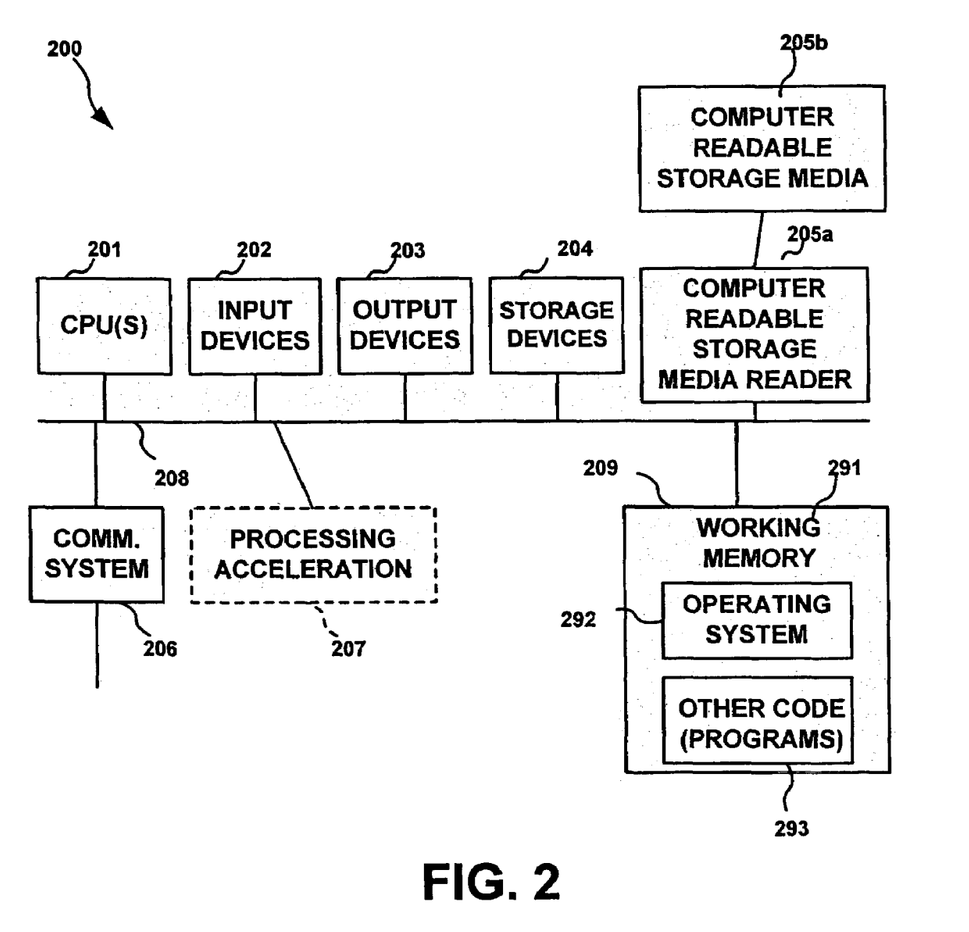
FIG. 2 shows an embodiment of a computing device for use with one embodiment of the invention.

FIG. 2 broadly illustrates an example of how computing devices, such as devices 508, 516, 524, and 528 in FIG. 5, can each be implemented. System 200 is shown comprised of hardware elements that are electrically coupled via bus 208, including a processor 201, input device 202, output device 203, storage device 204, computer-readable storage media reader 205a, communications system 206 processing acceleration (e.g., DSP or special-purpose processors) 207 and memory 209. Computer-readable storage media reader 205a is further connected to computer-readable storage media 205b, the combination comprehensively representing remote, local, fixed and/or removable storage devices plus storage media, memory, etc. for temporarily and/or more permanently containing computer-readable information, which can include storage device 204, memory 209 and/or any other such accessible system 200 resource. System 200 also comprises software elements (shown as being currently located within working memory 291) including an operating system 292 and other code 293, such as programs, applets, data and the like.

System 200 is desirable as an implementation alternative largely due to its extensive flexibility and configurability. Thus, for example, a single architecture might be utilized to implement one or more servers that can be further configured in accordance with currently desirable protocols, protocol variations, extensions, etc. However, it will be apparent to those skilled in the art that substantial variations may well be utilized in accordance with more specific application requirements. For example, one or more elements might be implemented as sub-elements within a system 200 component (e.g. within communications system 206). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) and certainly not all system 200 components will be required in all cases.

Figure 3:
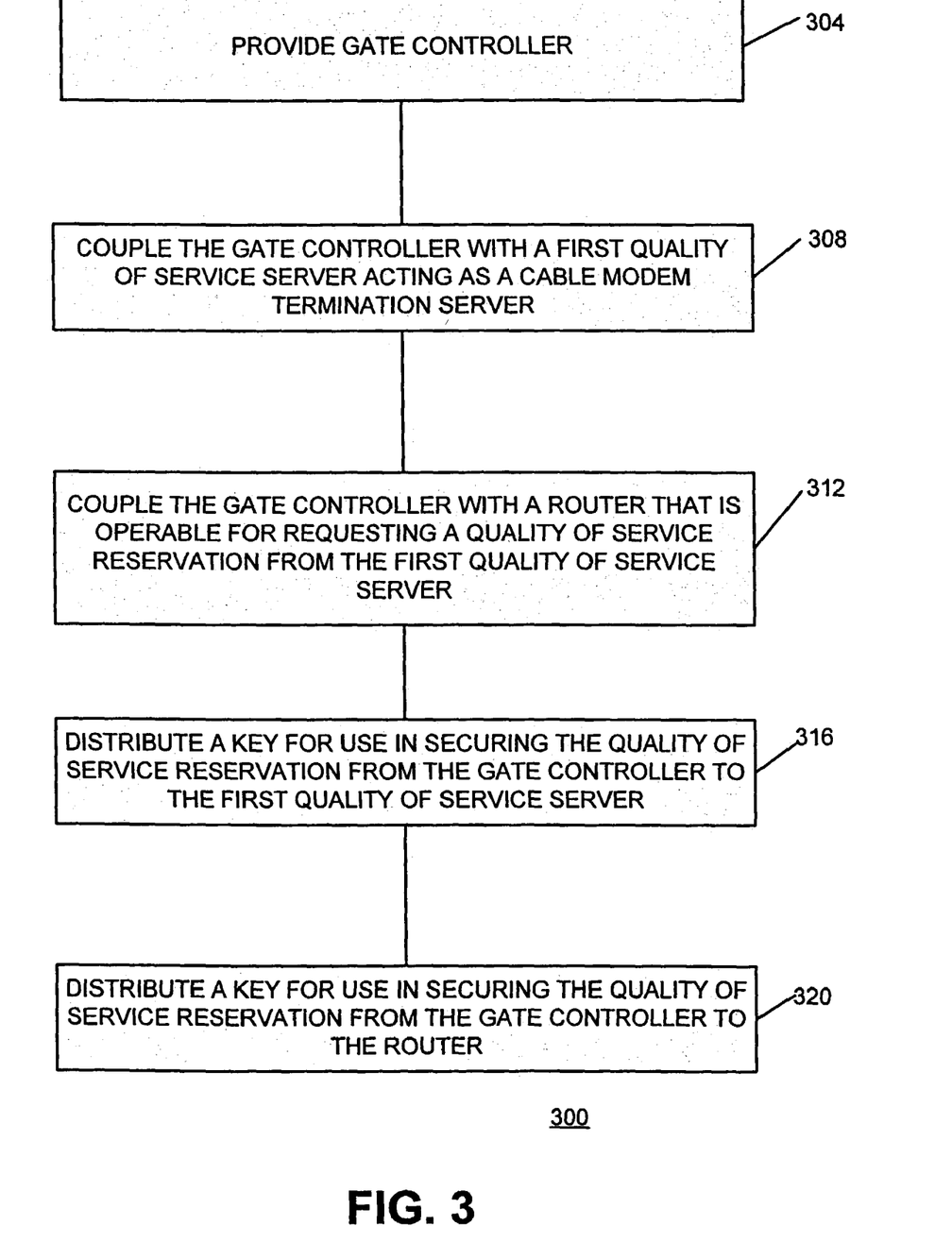
FIG. 3 shows a flowchart illustrating a method of providing quality of service for a client computer in an IP telephony system according to one embodiment of the invention.

FIG. 3 illustrates an example of providing quality of service in an IP telephony system. IP telephony is but one example of a communication system in which the present embodiments of the invention can implement quality of service authentication. In flowchart 300 a gate controller is provided in block 304. Such a gate controller can be a server such as call management system server 424 in FIG. 4, where call management server acts as a "signaling controller" by controlling the authentication of the client device. The gate controller is coupled with a first quality of service server acting as a cable modem termination server (CMTS) as shown in block 308. Referring to FIG. 4, CMTS 428 acts as the cable modem termination server. The gate controller is coupled with a media terminal adapter that is operable for requesting a quality of service reservation from the first quality of service server as shown in block 312. Again, the media terminal adapter 408 in FIG. 4 serves this purpose. In block 316 a key is distributed for use in securing the quality of service reservation from the gate controller to the first quality of service server. Such a key can be an authentication key used by the cable modem termination server 428 and an RSVP (Resource ReSerVation Protocol)—capable router 410 in FIG. 4. Note that the RSVP-capable router is located inside a customer's home network. In block 320 a key is distributed for use in securing the quality of service reservation to the RSVP-capable router. Thus, the RSVP-capable router 410 and the cable modem termination server 428 each can be provided with an authentication key for the reservation of quality of service between the router and the cable termination modem system.

Figure 6:
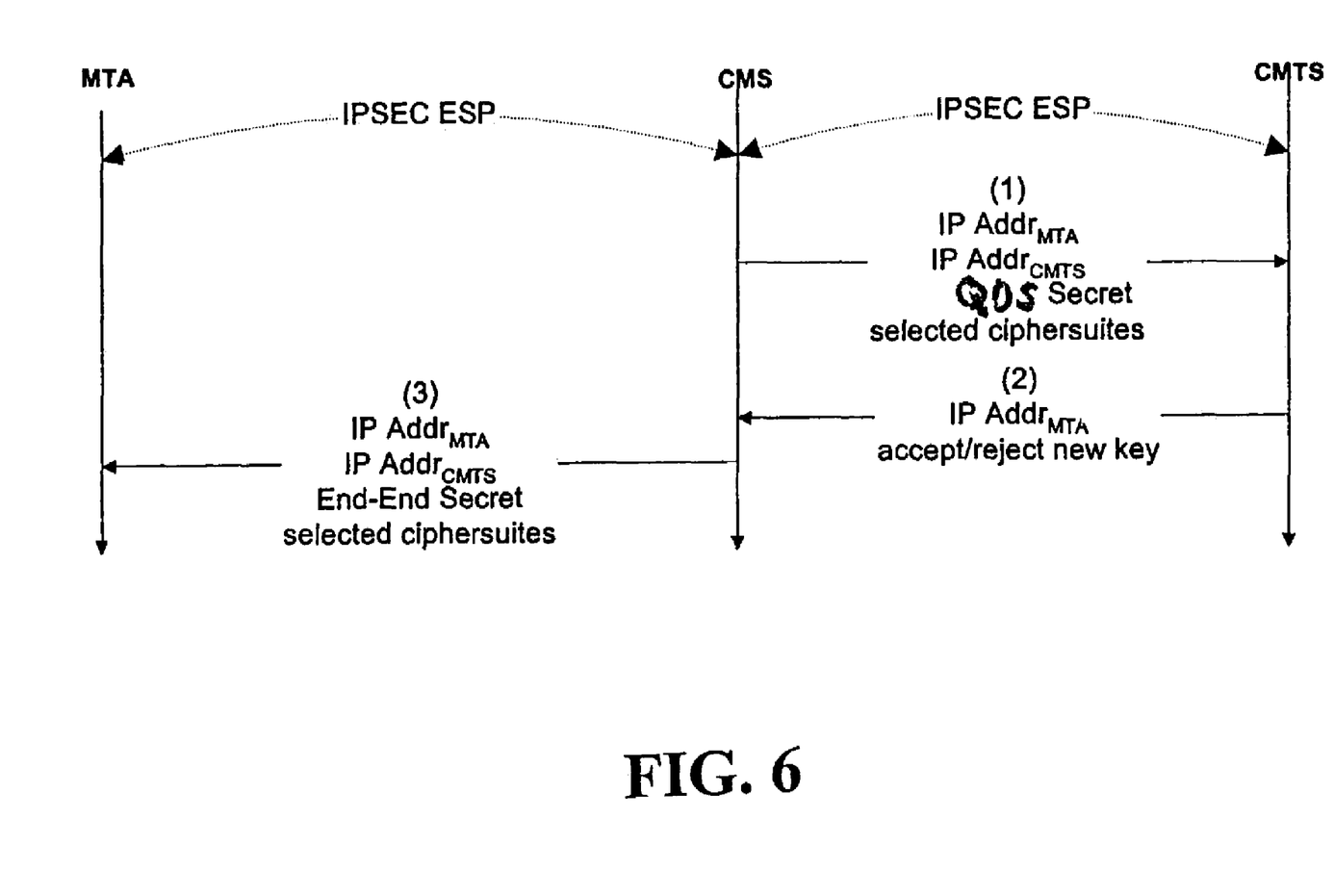
FIG. 6 illustrates a method of distributing keys between a client computer and a quality of service server according to one embodiment of the invention.

Referring now to FIG. 6, a method for conveying keys can be described according to one embodiment of the invention. FIG. 6 shows a process of distributing information between a call management system, such as a gate controller, and a media terminal adapter and cable modem termination system. FIG. 6 presumes that a secure interface exists between the CMS and CMTS via IPSEC ESP (Internet Protocol Security Encapsulating Security Payload). Furthermore, the CMS also has a secure interface with the MTA via IPSEC ESP. In the flow diagram of FIG. 6, the authentication keys for quality of service reservation are distributed by the CMS over the existing IPSEC links. In the step labeled 1, CMS distributes a message containing the IP address of the MTA, an IP address of the CMTS, the QoS secret authentication key and selected cipher suites. If the specified MTA does not have any other phone calls in progress, the CMTS will accept the new key and establish RSVP and IPSEC SAs for that MTA. If the specified MTA does have another phone call in progress, then the CMTS will reject the new key sent by the CMS and continue using its existing security associations (SAs) with that MTA. Note that in the case when there in an RSVP-capable router in the user's home network that is between the MTA and the CMTS, the QoS secret authentication key for that router sent by the CMS would not change on a per-call basis. In step 2 of the flowchart in FIG. 6, the CMTS tells the CMS whether or not it accepted the new key. It returns the IP address of the MTA and an indication as to whether the new key is accepted or rejected. If the CMTS did not accept the new key, there is no need to perform step 3. However, if the CMTS did accept the new key, the CMS distributes the same QoS secret key to the MTA. The IP address of the MTA serves as an additional integrity check that the QoS secret key is for the correct interface. The CMS also tells the MTA which cipher suites to use for the MTA-CMTS communication. The MTA then accepts the new key and establishes its new RSVP security associations for communication with the CMTS. In the case that there is an RSVP-capable router between the MTA and the CMTS, step 3 does not take place, since the QoS protocol in this case is authenticated between the router and the CMTS and the router is already configured with this key.

Figure 7:
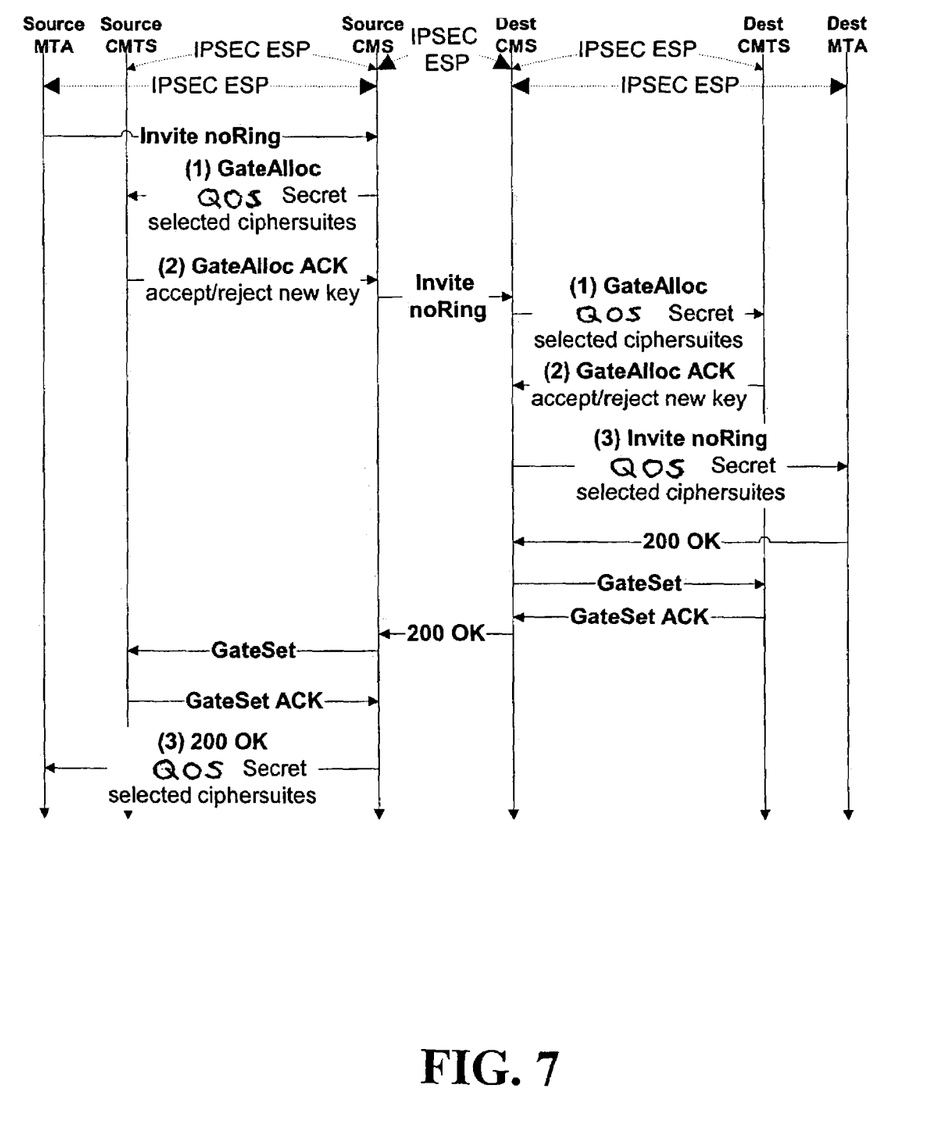
FIG. 7 illustrates a method of distributing a key between a client computer and a quality of service server according to one embodiment of the invention.
Figure 8:
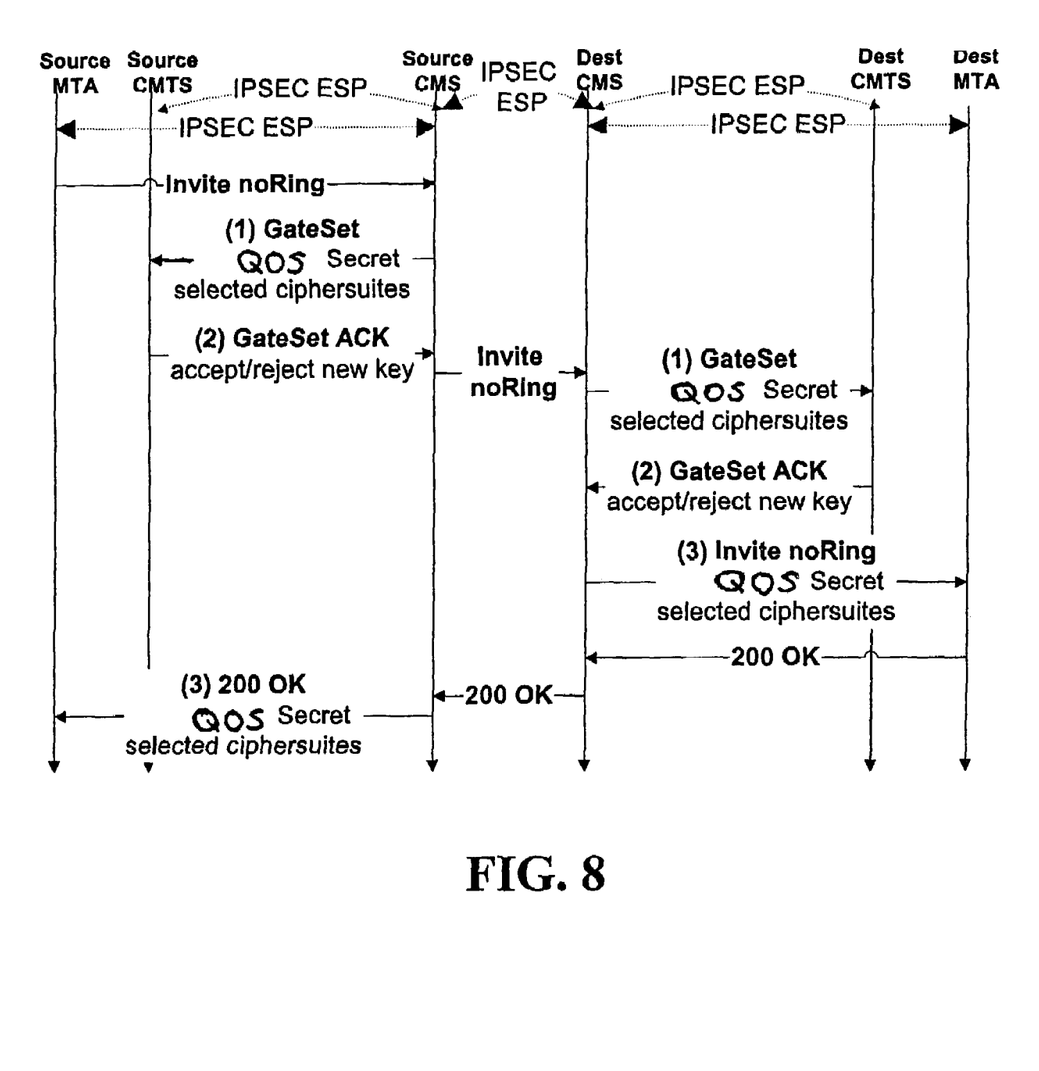
FIG. 8 illustrates a method of distributing a key between a client computer and a quality of service server according to one embodiment of the invention.

FIGS. 7 and 8 illustrate examples of distributing keys via SIP (Session Initiation Protocol) and COPS (Communication Open Policy Service) messages. The two diagrams in FIGS. 7 and 8 show the actual SIP and COPS messages that are used to carry out the distribution of QoS secret keys. Each protocol message that is involved in QoS key management is labeled with a number of the corresponding key management interface. SIP in this example is a call signaling interface that is used on the interface between an MTA and a CMS. COPS is used on a CMS-CMTS interface in order for a CMS to authorize a CMTS to reserve bandwidth for phone calls.

In the case when there is an intermediate RSVP-capable router between an MTA and CMTS, messages labeled (3) in both FIGS. 7 and 8 do not include the QoS secret and selected cipher suites as shown in the figures.

There are at least two possible variations of the key distribution over COPS, depending on whether or not the CMS sends to the CMTS a GateAlloc message prior to a GateSet. If there is a GateAlloc message, it can carry the QoS secret key. If not, the secret key can be carried inside a GateSet.

The name of each protocol message in FIG. 7 is in bold. Below the message name is the additional information that is added to the message, in order to perform the key distribution. Note that the MTA and CMTS IP addresses are not listed on these figures. That is because they are present in the respective SIP and COPS messages, regardless of the key management.

In an alternative embodiment of the invention, rather than creating a new key for each quality of service authorization, a quality of service client could in some cases have multiple quality of service reservations simultaneously. For example, a media terminal adapter could have multiple ports and support multiple conversations at the same time, wherein each conversation used a separate quality of service reservation. In such a case, it is not necessary for the signaling controller to generate a separate new key for each quality of service authorization. A single generated key could be assigned a key identifier and that key identifier could be sent to the quality of service client, such as the media terminal adapter or in the case of the router, between the media terminal adapter and the communication system the router itself. If the quality of service client requests an additional quality of service reservation from the signaling controller, the signaling controller could look up the quality of service client to identify if there are already existing quality of service reservations for the client. If such quality of service reservations are located, the signaling controller could then signal to both the client and to the first quality of service server, such as the cable modem termination server to use a previously generated key for a new quality of service reservation.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

The word "couple" as used in this patent is intended to mean capable of being in communication with another device. It is not intended to mean that two devices must be "directly connected." In addition, the words "comprising," "having," and "including" are intended to be open-ended terms and not closed-ended terms.

It is also noted that many of the structures, materials, and acts recited herein can be recited as means for performing a function or steps for performing a function. Therefore, it should be understood that such language is entitled to cover all such structures, materials, or acts disclosed within this specification and their equivalents, including the matter incorporated by reference.

It is thought that the apparatuses and methods of the embodiments of the present invention and many of its attendant advantages will be understood from this specification and it will be apparent that various changes may be made in the form, construction, and arrangement of the parts thereof without departing from the spirit and scope of the invention or sacrificing all of its material advantages, the form herein before described being merely exemplary embodiments thereof.

What is claimed is:

1. A method of securing a quality of service reservation, the method comprising:
   providing a signaling controller;
   coupling said signaling controller with a first Quality of Service (QoS) server configured for establishing quality of service in a communication system;
   coupling said QoS server with a router located on a local network of a user, wherein said router is coupled with a client computer configured for requesting a QoS reservation from said first QoS server;
   receiving by said router a quality of service key for authenticating said client computer, the quality of service key being provided by the user; and
   entering said quality of service key in a profile associated with said user at the signaling controller.

2. The method as described in claim 1, further comprising: distributing said quality of service key to said signaling controller.

3. The method as described in claim 2, further comprising: communicating said quality of service key to a customer support representative.

4. The method as described in claim 3, wherein said customer support representative enters said quality of service key received from said user into said user profile.

5. The method as described in claim 2, wherein said distributing said quality of service key to said signaling controller comprises:
   calling by the user a customer support representative for said signaling controller and notifying the customer support representative of the value of said quality of service key.

6. The method as described in claim 2, wherein said distributing said quality of service key to said signaling controller comprises:
   transmitting said quality of service key to a customer support representative via email.

7. The method as described in claim 1, wherein the quality of service key is manually provided by the user to said router.

8. A method of securing a quality of service reservation, the method comprising:
   providing a signaling controller;
   coupling said signaling controller with a first Quality of Service (QoS) server configured for establishing quality of service in a communication system;
   coupling said signaling controller with a router located on a local network of a user, wherein said router is coupled with a client computer configured for requesting a QoS reservation from said first QoS server;
   establishing a quality of service key for use by said router for authenticating said client computer, the quality of service key being established by the user;
   entering said quality of service key in a profile associated with said user at the signaling controller;
   receiving from said user said quality of service key for use by said signaling controller;
   receiving at said signaling controller a request from said client computer to authorize said first QoS server to provide said router with a QoS reservation; and
   conveying an authorization from said signaling controller to said first QoS server so as to authorize said first QoS server to provide said router with said QoS reservation,
   wherein said conveying an authorization comprises conveying said quality of service key to said first QoS server.

9. The method as described in claim 8, further comprising:
   receiving a QoS reservation request at said first QoS server from said router.

10. The method as described in claim 8, further comprising:
    in response to receipt by said first QoS server of said QoS reservation request from said router, checking by said first QoS server for said authorization received from said signaling controller; and
    utilizing said quality of service key to authenticate said reservation request.

11. The method as described in claim 10, further comprising:
    conveying a reply to said router so as to grant said QoS reservation request.

12. The method as described in claim 11, further comprising:
    utilizing RSVP for said QoS reservation.

13. The method as described in claim 11, wherein said client computer is a media terminal adapter.

14. The method as described in claim 8, wherein a secure interface between said signaling controller and said QoS server comprises IPSEC.

15. The method as described in claim 8, wherein a secure interface between said signaling controller and said client computer comprises IPSEC.

16. The method as described in claim 8, further comprising:
utilizing RSVP to implement the QoS reservation and wherein said quality of service key is an RSVP authentication key.

17. The method as described in claim 8, further comprising:
implementing an IP telephony call with said QoS reservation.

18. The method as described in claim 17, wherein said client computer is a media terminal adapter.

19. The method as described in claim 8, wherein the quality of service key is manually established by the user.

* * * * *